(12) United States Patent
Liu et al.

(10) Patent No.: US 10,655,381 B2
(45) Date of Patent: May 19, 2020

(54) LOCKING DEVICE AND OPENING AND CLOSING MECHANISM HAVING THE SAME

(71) Applicant: CRRC QINGDAO SIFANG ROLLING STOCK RESEARCH INSTITUTE CO., LTD., Qingdao (CN)

(72) Inventors: Hui Liu, Qingdao (CN); Kun Wang, Qingdao (CN); Kai Chen, Qingdao (CN); He Zhang, Qingdao (CN); Quan Liu, Qingdao (CN); Hui Huang, Qingdao (CN); Xudong Liu, Qingdao (CN)

(73) Assignee: CRRC QINGDAO SIFANG ROLLING STOCK RESEARCH INSTITUTE CO., LTD., Shangdong (CN)

( * ) Notice: Subject to any disclaimer, the term of this patent is extended or adjusted under 35 U.S.C. 154(b) by 150 days.

(21) Appl. No.: 15/832,655

(22) Filed: Dec. 5, 2017

(65) Prior Publication Data

US 2018/0094473 A1    Apr. 5, 2018

Related U.S. Application Data

(63) Continuation-in-part of application No. 14/991,907, filed on Jan. 8, 2016, now abandoned, which is a
(Continued)

(30) Foreign Application Priority Data

Oct. 18, 2013    (CN) .......................... 2013 1 0493600

(51) Int. Cl.
*E06B 3/32*    (2006.01)
*E05F 15/00*    (2015.01)
(Continued)

(52) U.S. Cl.
CPC .............. *E06B 3/325* (2013.01); *B61D 17/02* (2013.01); *B61D 17/06* (2013.01); *B61D 19/004* (2013.01);
(Continued)

(58) Field of Classification Search
CPC .......... E06B 3/325; E05F 15/00; B61D 17/00; B61D 17/02; B61D 17/06; B61D 17/08
(Continued)

(56) References Cited

U.S. PATENT DOCUMENTS 1,821,121 A * 9/1931 Stedefeld .................. B61B 3/02
                                                                  105/1.3
2,419,964 A * 5/1947 Newkirk .................. B60J 5/108
                                                                    292/1
(Continued)

FOREIGN PATENT DOCUMENTS

CN            201206386 Y  *  3/2009

*Primary Examiner* — Katherine W Mitchell
*Assistant Examiner* — Abe Massad
(74) *Attorney, Agent, or Firm* — J.C. Patents

(57) ABSTRACT

The present invention relates to the field of mechanical manufacturing technology, relating to a locking device. The locking device comprise a casing with a first end and a second end; a hole is formed on the first end, and the second end has an opening; a rod is provided within the casing; and a fastener is provided on the end portion of the rod outside the casing; a raised member located outside the casing is provided at a second end portion of the rod, the raised member having a diameter greater than a diameter of the opening and a gap being formed between the raised member and the casing; a spring is sleeved on the rod, and a first shaft is provided at the second end portion. An opening and closing mechanism having the locking device is further provided for the opening or closing of a fairing.

19 Claims, 16 Drawing Sheets

Related U.S. Application Data continuation-in-part of application No. PCT/CN2013/087112, filed on Nov. 14, 2013.

(51) Int. Cl.
  *B61D 19/00* (2006.01)
  *B61D 17/02* (2006.01)
  *B61D 17/06* (2006.01)

(52) U.S. Cl.
  CPC ........... *E05F 15/00* (2013.01); *E05Y 2900/51* (2013.01); *Y02T 30/32* (2013.01)

(58) Field of Classification Search
  USPC .......................................................... 49/340
  See application file for complete search history.

(56) References Cited

U.S. PATENT DOCUMENTS

| | | | | |
|---|---|---|---|---|
| 4,330,958 | A * | 5/1982 | Richmond | E05B 47/026 49/280 |
| 4,655,144 | A * | 4/1987 | Frech | B60J 5/0497 105/149.1 |
| 6,385,910 | B1 * | 5/2002 | Smink | B60J 5/062 49/218 |
| 6,640,387 | B2 * | 11/2003 | Alonso | E05F 3/108 16/72 |
| 9,022,238 | B2 * | 5/2015 | Bremekamp | B61D 17/06 105/413 |
| 2003/0217513 | A1 * | 11/2003 | Fink | B60J 5/062 49/360 |
| 2011/0296762 | A1 * | 12/2011 | Ahrens | B61D 17/06 49/340 |
| 2013/0042788 | A1 * | 2/2013 | Scholz | B61D 17/06 105/413 |
| 2013/0133547 | A1 * | 5/2013 | Heinisch | B61D 17/00 105/413 |

* cited by examiner

LOCKING DEVICE AND OPENING AND CLOSING MECHANISM HAVING THE SAME

CROSS-REFERENCE TO RELATED APPLICATION

This application is a continuation-in-part application of, and claims the priority benefit of, U.S. application Ser. No. 14/991,907, filed on Jan. 8, 2016, now pending, which is a continuation-in-part of international Application No. PCT/CN2013/087112, filed on Nov. 14, 2013, which in turn claims the priority benefits of Chinese Patent Application No. 201310493600.1, filed on Oct. 18, 2013. The contents of the above identified applications are incorporated herein by reference in their entirety.

TECHNICAL FIELD

The present invention relates to the field of mechanical manufacturing technology, in particular to a locking device and an opening and closing mechanism having the same.

BACKGROUND OF THE PRESENT INVENTION

In order to realize reconnection or return rescue, usually a front-end opening and closing mechanism is installed in a railway high-speed train. As an important part of a railway high-speed train, the front-end opening and closing mechanism is at a closed state during normal running (i.e. at a non-reconnection state) of the railway high-speed train, during this time, a front-end fairing cabin door is closed so as to prevent vanes, dust, ice and snow from entering and to protect the coupler and other facilities in the front-end fairing, ensuring a good aerodynamic profile of the railway high-speed train. In case of return or rescue, the opening and closing mechanism can be either automatically opened or manually opened, thus opening the front-end fairing cabin door, the full-automatic coupler is stretched out for normal coupling.

At present, a familiar front-end opening and closing mechanism usually consists of a pushing device and a locking device. In order to achieve opening and closing the opening and closing mechanism and realize a reliable locking, the conventional opening and closing mechanism usually is provided with several independent locking devices. Consequently, the opening-closing process and the locking process of the opening and closing mechanism usually are achieved by different operations, which require two or more different air cylinders, resulting in comparatively complex mechanical structure and automatic control theory of the opening and closing mechanism, as well as correspondingly higher cost and lower reliability.

Chinese Patent Application CN201206386Y disclosed a front-cover opening and closing mechanism which provides a four-link device to implement a return mechanism which drives left and right portions of the front cover to automatically open/close along a set track. Essentially, the mounting wing rotates around the rotating shaft to realize the function of opening or closing. In an implementation, the connecting base is pulled to do anterior-posterior translation by the effect of the opening and closing cylinder, and the translation is applied to the mounting wing by the links so that the mounting wing is opened/closed.

SUMMARY OF THE PRESENT INVENTION

For the above-mentioned disadvantages of the prior opening and closing mechanism at the front-end of a railway high-speed train, the present application provides a locking device and an opening and closing mechanism having the same, which is simple and reliable in structure, convenient for examination and repair, and low in cost.

An implementation of the present application provides a locking device, comprising a casing, wherein the casing has a first end of the casing and a second end of the casing; a hole is formed on the first end, and the second end has an opening; a rod, which passes through the hole in the direction of the first end of the casing and extends out of the casing, is provided within the casing; an end portion of the rod outside the casing is a first end portion, and a fastener is provided thereon; a raised member located outside the casing is provided at a second end portion of the rod, the raised member having a diameter greater than a diameter of the opening and a gap being formed between the raised member and the casing; a spring is sleeved on the rod, and when the gap becomes zero, the spring on the rod is at least in a compressed state; and a first shaft is also provided at the second end portion.

As a preferred implementation, the spring is pre-compressed on the rod.

As a preferred implementation, a rolling wheel is rotatably sleeved on the first shaft.

As a preferred implementation, a cover plate having a diameter greater than an outer diameter of the rolling wheel is provided above the first shaft and the rolling wheel.

As a preferred implementation, the rod is a cylinder that can rotate within the casing; and a first baffle is provided between a front surface of the raised member and a front surface of the casing, and a second baffle is provided between a rear surface of the raised member and a rear surface of the casing.

As a preferred implementation, the rod has a first segment on which the first end portion is located and has a second segment on which the second end portion is located; the first segment has a diameter less than a diameter of the second segment; the spring is sleeved on the first segment and is pre-compressed into a chamber formed between the second segment and the first end of the casing.

As a preferred implementation, the first shaft is mounted on the raised member; or the first shaft and the raised member are of a unitary structure; or the rod, the raised member and the first shaft are of an all-in-one structure.

A second implementation of the present application provides an opening and closing mechanism having the locking device, comprising a baseplate, a fairing, a support arm, and a powered push cylinder; a third shaft is provided on the baseplate; a first end of the support arm is rotatably sleeved on the third shaft, and a second end of the support arm is connected to the fairing by a fairing mounting base; a second shaft is provided on the locking device, and the locking device is rotatably mounted on the baseplate by the second shaft; a sliding groove in which the first shaft of the locking device is slidably located is formed on the support arm; the locking device is connected to a piston rod of the powered push cylinder, so that the piston rod can push the locking device to rotate with respect to the baseplate, and the first shaft slides in the sliding groove to cause the support arm to push the fairing mounting base so as to open or close the fairing; and the opening and closing mechanism is further provided with a closed-state limit stop and an open-state limit stop.

As a preferred implementation, for each structure and connection relation in the opening and closing mechanism, there are two sets, and the two sets are symmetrically arranged on the baseplate; the fairing comprises a first fairing and a second fairing, the support arm comprises a first support arm and a second support arm, the cylinder comprises a first cylinder and a second cylinder, the locking device comprises a first locking device and a second locking device; the opening and closing mechanism shares the same baseplate and the same third shaft; and the first end of the first support arm and the first end of the second support arm are both sleeved on the third shaft.

Alternatively, as a preferred implementation, for each structure and connection relation in the opening and closing mechanism, there are two sets, and the two sets are symmetrically arranged on the baseplate; the fairing comprises a first fairing and a second fairing, the support arm comprises a first support arm and a second support arm, the cylinder comprises a first cylinder and a second cylinder, the locking device comprises a first locking device and a second locking device; the opening and closing mechanism shares the same baseplate; a fourth shaft is further provided in the opening and closing mechanism, and the third shaft and the fourth shaft are symmetrically arranged on the baseplate; and the first end of the first support arm is mounted on the third shaft, and the first end of the second support arm is mounted on the fourth shaft.

As a preferred implementation, the locking device is hinged with the piston rod at a connection position.

As a preferred implementation, the connection position is on the casing, or on the raised member, or on the first baffle or the second baffle.

As a preferred implementation, the closed-state limit stop, arranged at an end close to the closed direction of the fairing, comprises a first projection and a first receive part, one of which can restrain the other from further movement; and the open-state limit stop, arranged at an end close to the open direction of the fairing, comprises a second projection and a second receive part, one of which can restrain the other from further movement.

As a preferred implementation, the first projection is arranged on the baseplate at the end close to the closed direction of the fairing, and the first receive part is arranged on the support arm at the end close to the closed direction of the fairing; or the positions of the first projection and the first receive part can be exchanged; or the first projection is arranged on the fairing at the end close to the closed direction of the fairing, and the first receive part is arranged on the baseplate at the end close to the closed direction of the fairing; or the positions of the first projection and the first receive part can be exchanged;

the second projection is arranged on the baseplate at the end close to the open direction of the fairing, and the second receive part is arranged on the support arm at the end close to the open direction of the fairing; or the positions of the second projection and the second receive part can be exchanged; or the second projection is arranged on the fairing at the end close to the open direction of the fairing, and the second receive part is arranged on the baseplate at the end close to the open direction of the fairing; or the positions of the second projection and the second receive part can be exchanged.

As a preferred implementation, a length of the sliding groove is controlled such that a side of the sliding groove close to the second end of the support arm remains in surplus when the locking device is perpendicular to the sliding groove, for the locking device being self-locked.

As a preferred implementation, at a lower end of the second shaft, there is further an extension portion which is used for unlocking or locking manually.

The advantageous effects of the invention:
the present application is simple and reliable in structure, low in cost, high in stability, and convenient for examination and repair; a power source is used for realization of opening and closing of the opening and closing mechanism, mechanical self-lock is achieved by means of over "dead point" for locking the opening and closing mechanism so as to hold at an established state; the present application achieves opening and closing by one action, and simultaneously realizes the locking function of the opening and closing mechanism without additional power sources, changing the fact that additional locking devices and power sources are required for realization of the locking function of the previous opening and closing mechanism, and simplifying the structure of the opening and closing mechanism on the basis of realization of the locking function of the opening and closing mechanism.

In addition, the lower end of the locking device of the present application is provided with an extension portion of the second shaft, by which manual unlocking and manual locking are realized, so that the manual unlocking and the manual locking become simple.

BRIEF DESCRIPTION OF THE DRAWINGS

FIG. 16 is a view of the third implementation of the opening and closing mechanism when in the open state, in which:

Figure 1:
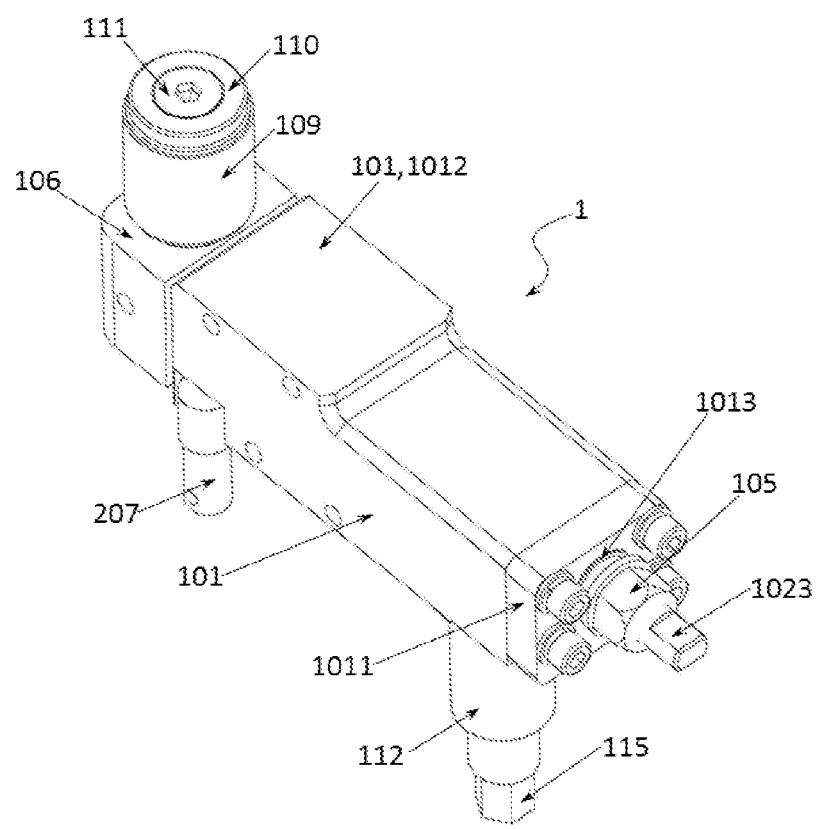
FIG. 1 is a structural diagram of a locking device.

1: locking device; 11: first locking device; 12: second locking device; 101: casing; 1011 first end of the casing; 1012: second end of the casing; 1013: hole; 1014: opening; 102: rod; 1021: first segment; 1022: second segment; 1023: first end portion; 1024: second end portion; 103: spring; 104: chamber; 105: fastener; 106: raised member; 107: gap; 108: first shaft; 109: rolling wheel; 110: cover plate; 111: connecting member; 112: second shaft; 113: first baffle; 114: second baffle; and 115: extension portion;

2: opening and closing mechanism; 201: baseplate; 202: fairing; 221: first fairing; 222: second fairing; 203: support arm; 231: first support arm; 232: second support arm; 2031: first end of the support arm; 2032: second end of the support arm; 2033: sliding groove; 204: powered push cylinder; 241: first cylinder; 242: second cylinder; 2041: piston rod; 205: third shaft; 206: fairing mounting base; 207: connection position; 208: closed-state limit stop; 2081: first projection; 2082: first receive part; 209: open-state limit stop; 2091: second projection; 2092: second receive part; and 210: fourth shaft.

DETAILED DESCRIPTION OF THE PRESENT INVENTION

The technical solutions of the present application will be described below in detail by specific implementations. However, it should be understood that, unless otherwise stated, elements, structures and features in one implementation may be beneficially combined in other implementations.

In the description of the present application, it is to be noted that terms "first", "second" and the like are merely descriptive and should not be interpreted to indicate or imply the relative importance; and terms "inside", "outside", "front", "rear" and the like are used with respect to the directions in the drawings and form no absolute limitation to the position. The implementations are merely descriptions of the preferred implementation of the present application and form no limitation to the scope of the present application. Any modifications and improvements made to the technical solutions of the present application by a person of ordinary skill in the art shall fall into the protection scope defined by the appended claims, without departing from the design spirit of the present application.

I. Locking Device

Figure 2:
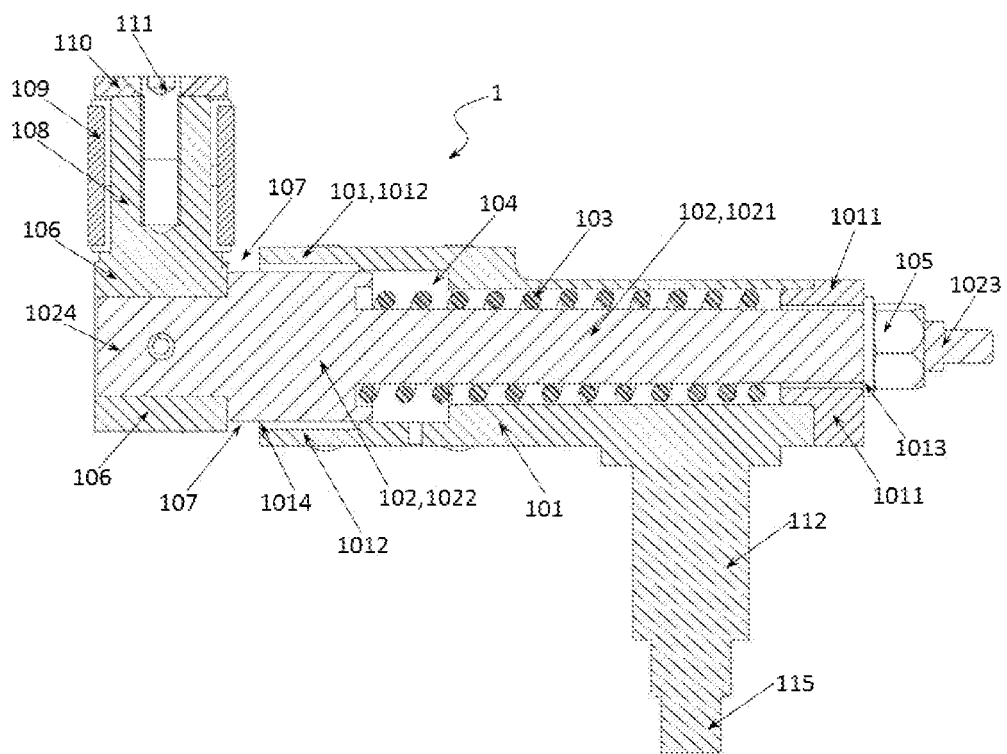
FIG. 2 is a first longitudinally sectional view of the locking device.
Figure 3:
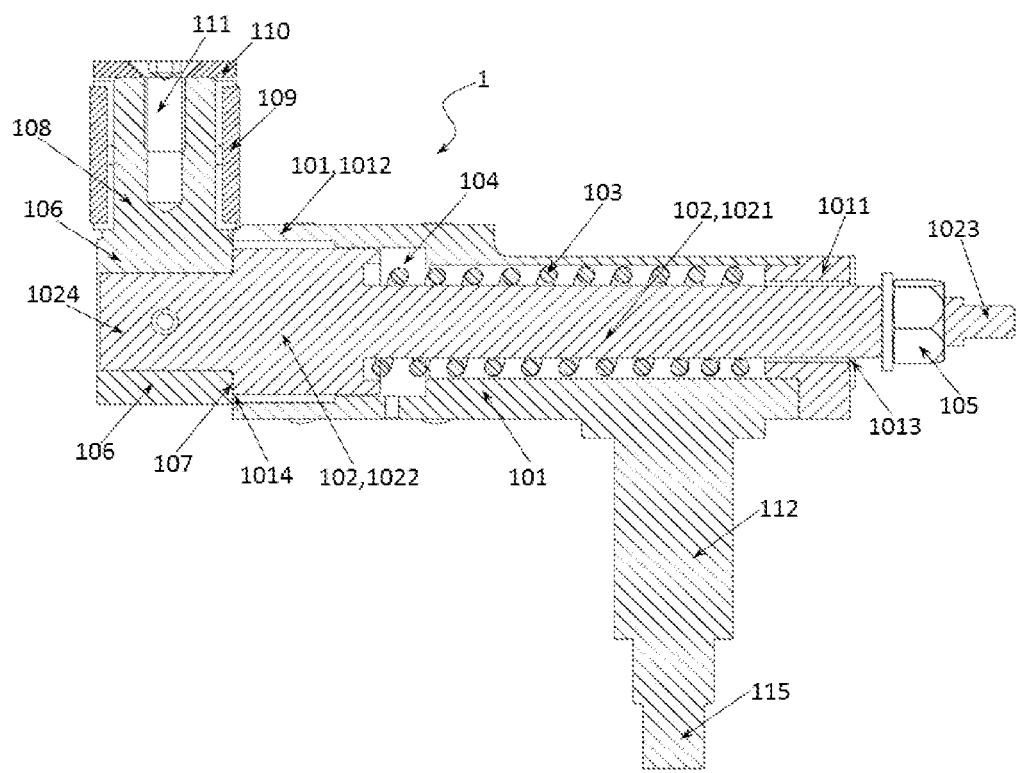
FIG. 3 is a second longitudinally sectional view of the locking device.

As shown in FIGS. 1-3, a locking device 1 comprises a casing 101; the casing 101 has a first end 1011 of the casing and a second end 1012 of the casing; and a hole 1013 is formed on the first end 1011, and the second end 1012 has an opening 1014.

As shown in FIG. 2 and FIG. 3, a rod 102 is provided within the casing 101, and the rod 102 is preferably of a cylindrical structure; a spring 103 is sleeved on the rod 102; and the rod 102 passes through the hole 1013 in the direction of the first end 1011 of the casing and extends out of the casing 101, and an end portion of the rod 102 outside the casing is a first end portion 1023 on which a fastener 105 is provided.

Since the fastener 105 is located outside the casing, it has a diameter greater than that of the hole. This prevents the first end portion 1023 of the rod from entering the casing 101 due to a resilience force from the spring 103 or a pull force from other members on the rod 102 when in use, and thus prevents the rod 102 from separating from the casing 101 from the second end 1012 of the casing. The fastener 105 can be a conventionally fixed structure, for example, a nut, which is convenient for mounting and dismounting.

The rod 102 also has a second end portion 1024 which is provided with a raised member 106 located outside the casing 101. The raised member 106 has a diameter greater than that of the opening 1014, and a gap 107 is formed between the raised member 106 and the casing 101, as shown in FIG. 2. The spring 103 can compressed when the rod 102 moves toward the first end 1011, and when the raised member 106 comes into contact with the casing 101, the gap 107 becomes zero, and the raised member 106 is blocked by the casing 101 so that it is unable to move toward the first end 1011 continually. This can prevent the over-compression of the spring 103. In this case, the fastener 105 has left the first end 1011 of the casing, as shown in FIG. 3.

The second end portion 1024 is also provided with a first shaft 108.

As a preferred implementation, as shown in FIG. 2 and FIG. 3, the rod 102 can be divided into a first segment 1021 on which the first end portion 1023 is located, and a second segment 1022 on which the second end portion 1024 is located. The first segment 1021 has a diameter less than that of the second segment 1022. Both the first segment 1021 and the second segment 1022 are preferred of a cylindrical structure.

As a preferred implementation, the spring 103 is sleeved on the first segment 1021, and the spring 103 is pressed into a chamber 104 formed between the second segment 1022 of the rod and the first end 1011 of the casing. Thus, the spring 103 has an outer diameter less than the diameter of the second segment 1022 and greater than the diameter of the hole 1013, so that the spring 103 is restricted within a space between the second segment 1022 and the first end 1011.

It can be understood that, when the rod 102 is not divided into a first segment and a second segment, the spring 103 can be located on the rod between the raised member 106 and the first end 1011 of the casing.

As a preferred implementation, the spring 103 is pre-compressed on the rod 102, as shown in FIG. 2, might be pre-compressed in the chamber 104. The pre-compressed state means that the spring 103 is always in a compressed state. That is, once mounted, the spring 103 is compressed on the rod in advance. When the fastener 105 gets close to the first end 1011 of the casing, it is in a first compressed state which is a minimal compressed state, as shown in FIG. 2; and when the gap 107 becomes zero, it is in a second compressed state which is a maximal compressed state, as shown in FIG. 3.

As a preferred implementation, the first shaft 108 can be mounted on the raised member 106. In this way, the first shaft 108 also plays the role of the raised member 106. Alternatively, as shown in FIG. 2 and FIG. 3, the first shaft 108 and the raised member 106 can be of a unitary structure.

As a preferred implementation, the rod 102, the raised member 106 and the first shaft 108 can be of an all-in-one structure. They are integrally manufactured during the molding, which saves the cost for mounting.

As a preferred implementation, a rolling wheel 109 is rotatably mounted on the first shaft 108.

As a preferred implementation, a cover plate 110 is provided above the first shaft 108 and the rolling wheel 109 and has a diameter greater than the outer diameter of the rolling wheel 109 to prevent the rolling wheel 109 from moving upwards during its rotation and from disconnecting from the first shaft 108. The cover plate 110 may be fixed onto the first shaft 108 by a connecting member 111, such as a screw, bolt, pin or the like.

As a preferred implementation, the casing 101 is provided with a second shaft 112 used for mounting the locking device 1; and the second shaft 112 is preferably arranged at a position close to the first end 1011 and used for fixing the locking device 1 onto other members.

Figure 4:
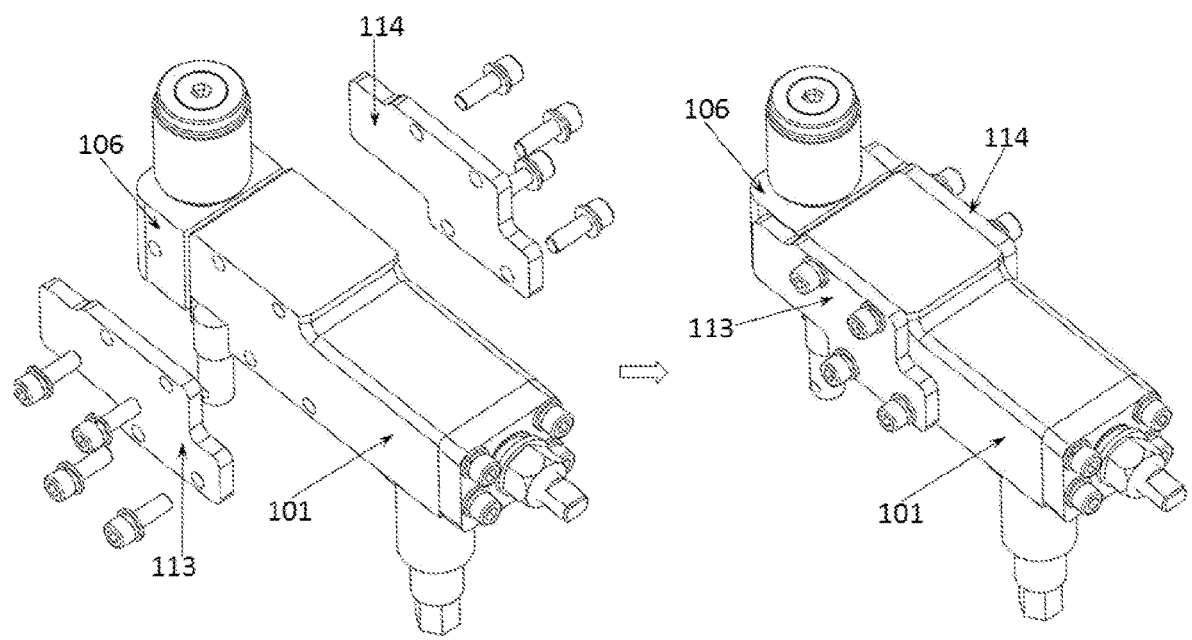
FIG. 4 shows an exploded view and an assembled view of the locking device.

As a preferred implementation, the rod 102 can rotate in the casing 101 when it is cylindrical, as shown in FIG. 4, to drive the raised member 106 and the first shaft 108 to rotate in the forward and backward directions. In this way, the first shaft 108 can be rotated to the horizontal direction. By taking the locking device 1 moving in a sliding groove as an example, when the locking device 1 moves in the sliding groove and a failure occurs, the first shaft 108 can be rotated to the horizontal direction so that the overall height of the locking device 1 is reduced. In this way, it is convenient to take the locking device from the beneath of sliding groove. In this structure, when the locking device 1 moves in the sliding groove, in order to prevent the first shaft 108 from rotating in the forward and backward directions when a force is applied thereto, as a preferred implementation, a first baffle 113 is provided between a front surface of the raised member 106 and a front surface of the casing 101, and a second baffle 114 is provided between a rear surface of the raised member 106 and a rear surface of the casing 101, as shown in FIG. 4. The baffles may be fixed on the front and rear surfaces of the locking device 1 by connecting members such as bolts. Therefore, during the running of the locking device 1, the baffles are fixed on the locking device 1. While during the dismounting, it is only needed to dismount the baffles and then rotate the rod 102 to extract the first shaft 108 and the rolling wheel 109 or other structures from the sliding groove, without dismounting a complicated support arm.

II. Opening and Closing Mechanism Having the Locking Device

Figure 5:
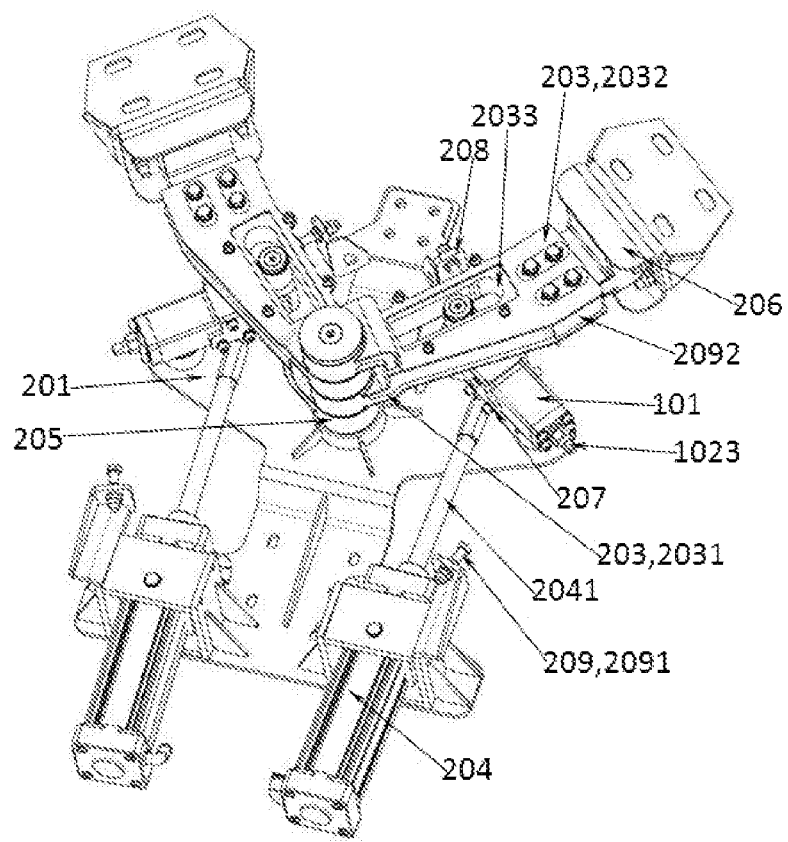
FIG. 5 is a stereoscopic front top view of an opening and closing mechanism.
Figure 6:
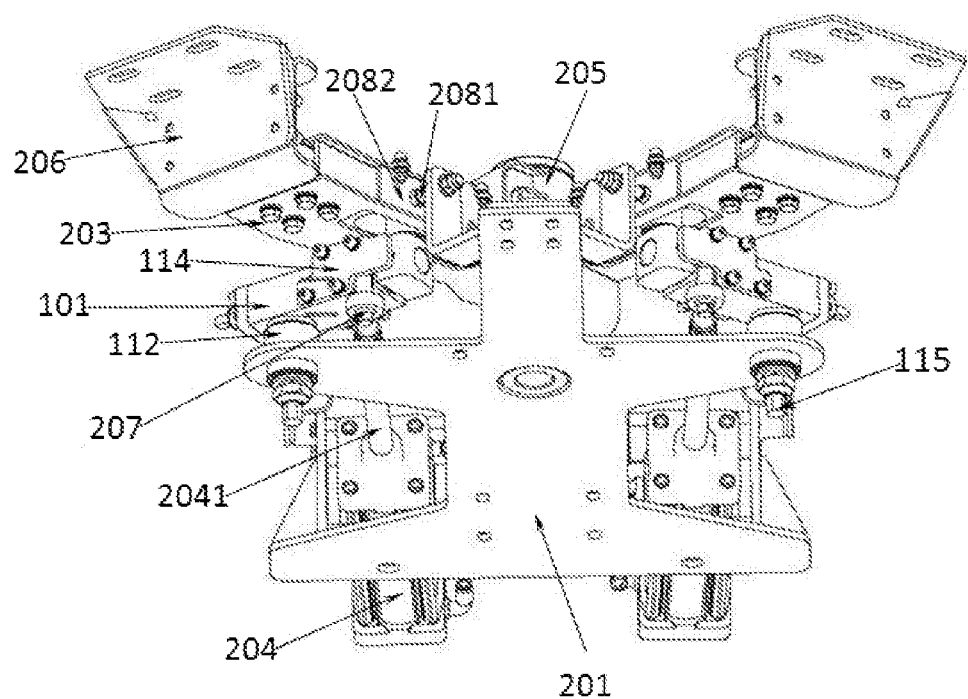
FIG. 6 is a stereoscopic back bottom view of the opening and closing mechanism.
Figure 7:
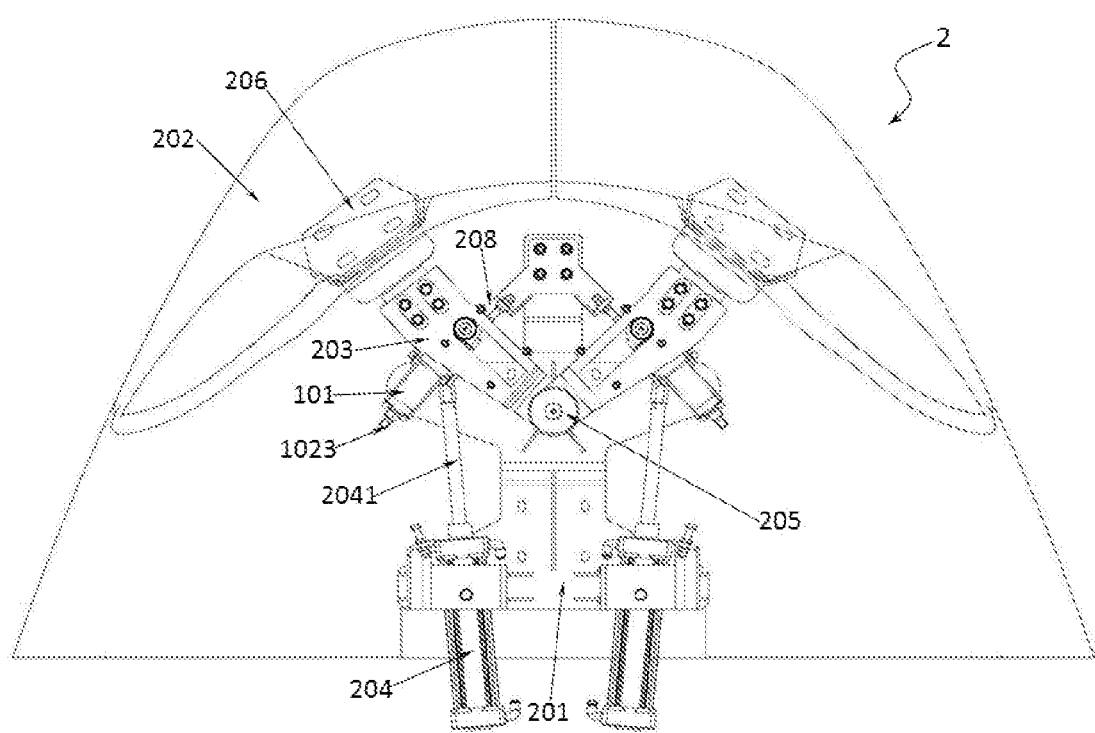
FIG. 7 is a first top view of a first implementation of the opening and closing mechanism.

As shown in FIGS. 5-7, an opening and closing mechanism 2 having a locking device comprises a baseplate 201, a fairing 202, a support arm 203, and a powered push cylinder 204.

A third shaft 205 is provided on the baseplate 201 and a first end 2031 of the support arm is rotatably sleeved thereon, and a second end 2032 of the support arm is connected to the fairing 202 by a fairing mounting base 206.

On the baseplate 201, provided is the above-mentioned locking device 1 which is rotatably mounted on the baseplate 201 by the second shaft 112.

A sliding groove 2033 in which the first shaft 108 of the locking device 1 is located in a sliding manner is provided on the support arm 203; the locking device 1 is connected to a piston rod 2041 of the powered push cylinder 204 at a connection position 207 which is in an extension direction of the second shaft 112 toward the second end 1012, so that the piston rod 2041 can push the locking device 1 by the connection position 207 to rotate with respect to the baseplate 201, and the first shaft 108 slides in the sliding groove 2033 to cause the support arm 203 to push the fairing mounting base 206 so as to open or close the fairing 202.

The opening and closing mechanism 2 is also provided with a closed-state limit stop 208 and an open-state limit stop 209.

As a preferred implementation, for each structure and connection relation in the above opening and closing mechanism 2, there are two sets, and the two sets are symmetrically arranged on the baseplate 201, as shown in FIGS. 5-13. That is, the fairing 202 includes a first fairing 221 and a second fairing 222, the support arm 203 includes a first support arm 231 and a second support arm 232, the cylinder 204 includes a first cylinder 241 and a second cylinder 242, the locking device 1 includes a first locking device 11 and a second locking device 12; and so on. The opening and closing mechanism 2 might share a same baseplate 201 and a same third shaft 205. In this case, the first end 2031 of the first support arm 231 and that of the second support arm 232 are both sleeved on the third shaft 205.

Figure 14:
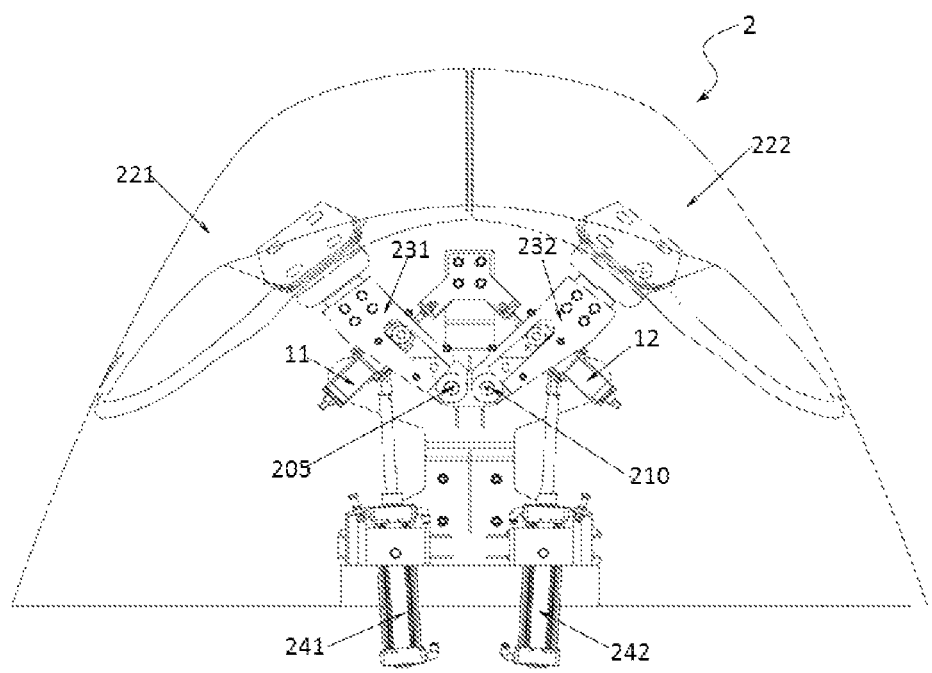
FIG. 14 is a top view of a second implementation of the opening and closing mechanism.

As a preferred implementation, alternatively, as shown in FIG. 14, a fourth shaft 210 is also provided in the opening and closing mechanism 2, and the third shaft 205 and the fourth shaft 210 are symmetrically arranged on the baseplate 201; and the first end of the first support arm 231 is mounted on the third shaft 205, and the first end of the second support arm 232 is mounted on the fourth shaft 210.

Compared with the case in which only one rotating shaft (the third shaft 205) is provided, the arrangement of two rotating shafts (the third shaft 205 and the fourth shaft 210), on one hand, can reduce the mutual influence between the two support arms, especially the mutual friction in the axial direction of the rotating shaft; and on the other hand, can locate the two support arms in a same horizontal level, thereby avoiding the influence caused by the position difference of the two support arms (at different heights) when they share a same shaft.

As a preferred implementation, the locking device 1 might be hinged (for example, spherically hinged, etc.) with the piston rod 2041 at the connection position 207. The connection position 207 may be located on the casing 101, for example, at the lower end of the casing 101 (as shown in FIG. 1), or on the raised member 106, or on the first baffle 113 or the second baffle 114. The connection position 207 will be further from the second shaft 112 if it get closer to the second end portion 1024 of the rod, and it is easier for the piston rod 2041 to push the locking device 1 to rotate.

As a preferred implementation, as shown in FIGS. 5-7, the closed-state limit stop 208 is arranged at an end close to the closed direction of the fairing. The closed-state limit stop 208 may comprises a first projection 2081 and a first receive part 2082, one of which can restrain the other from further movement; and the two are interacted and matched with each other and used for preventing the fairing 202 from continuing closing after reaching a set closed degree and further avoiding the damage to the fairing 202. The open-state limit stop 209 is arranged at an end close to the open direction of the fairing. The open-state limit stop 209 may comprises a second projection 2091 and a second receive part 2092, one of which can restrain the other from further movement; and the two are interacted and matched with each other and used for preventing the fairing 202 from continuing opening after reaching a set open degree.

As a preferred implementation, as shown in FIGS. 5-7, the first projection 2081 is arranged on the baseplate 201 at the end close to the closed direction of the fairing 202, and the first receive part 2082 is arranged on the support arm 203 at the end close to the closed direction of the fairing 202. Or, the positions of the first projection 2081 and the first receive part 2082 can be exchanged.

As a preferred implementation, as shown in FIGS. 5-7, the second projection 2091 is arranged on the baseplate 201 at the end close to the open direction of the fairing 202, and the second receive part 2092 is arranged on the support arm 203 at the end close to the open direction of the fairing 202. Or, the positions of the second projection 2091 and the second receive part 2092 can be exchanged.

Figure 15:
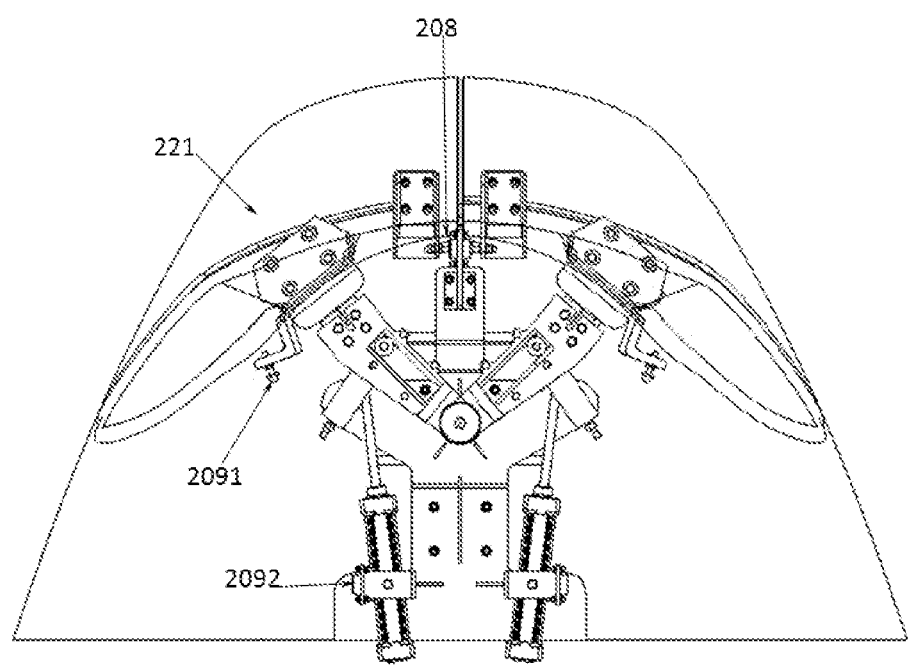
FIG. 15 is a view of a third implementation of the opening and closing mechanism when in the closed state.
Figure 16:
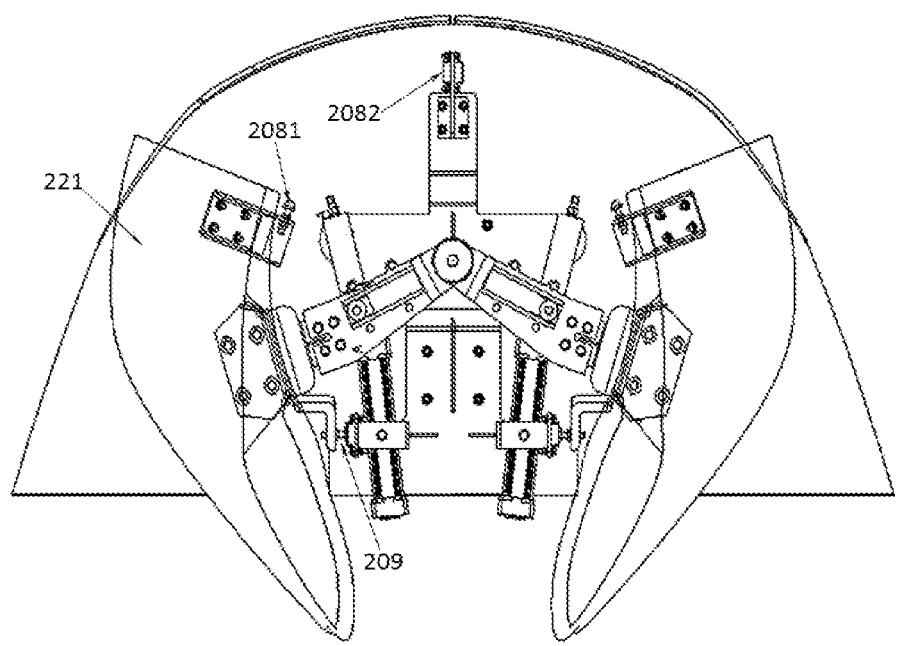

As a preferred implementation, as shown in FIG. 15 and FIG. 16, the first projection 2081 is arranged on the fairing 202 at the end close to the closed direction of the fairing 202, and the first receive part 2082 is arranged on the baseplate 201 at the end close to the closed direction of the fairing 202. Or, the positions of the first projection 2081 and the first receive part 2082 can be exchanged.

As a preferred implementation, as shown in FIG. 15 and FIG. 16, the second projection 2091 is arranged on the fairing 202 at the end close to the open direction of the fairing 202, and the second receive part 2092 is arranged on the baseplate 201 at the end close to the open direction of the fairing 202. Or, the positions of the second projection 2091 and the second receive part 2092 can be exchanged.

The positions for arranging the limit stops 208 and 209 are not limited to the above implementations, as long as the fairing can be prevented from continuing closing or opening after reaching a certain closed or open degree by the mutual limit of the projection and the receive part, in order to avoid the damage to the fairing.

As a preferred implementation, the length of the sliding groove 2033 is controlled such that a side of the sliding groove 2033 close to the second end 2032 of the support arm remains in surplus when the locking device 1 is perpendicular to the sliding groove 2033, so that the locking device 1 can be self-locked.

The working process and working principle of the present application will be described below by taking an opening and closing mechanism having a locking device as an example.

The steps successively shown from FIG. 7 to FIG. 13 show a process of the opening and closing mechanism 2 from a closed state to an open state, and a process of the opening and closing mechanism 2 from the open state to closed state is realized when performing those steps in a reverse order. The opening process and the closing process will be described below, respectively.

(1) Opening Process

Figure 12:
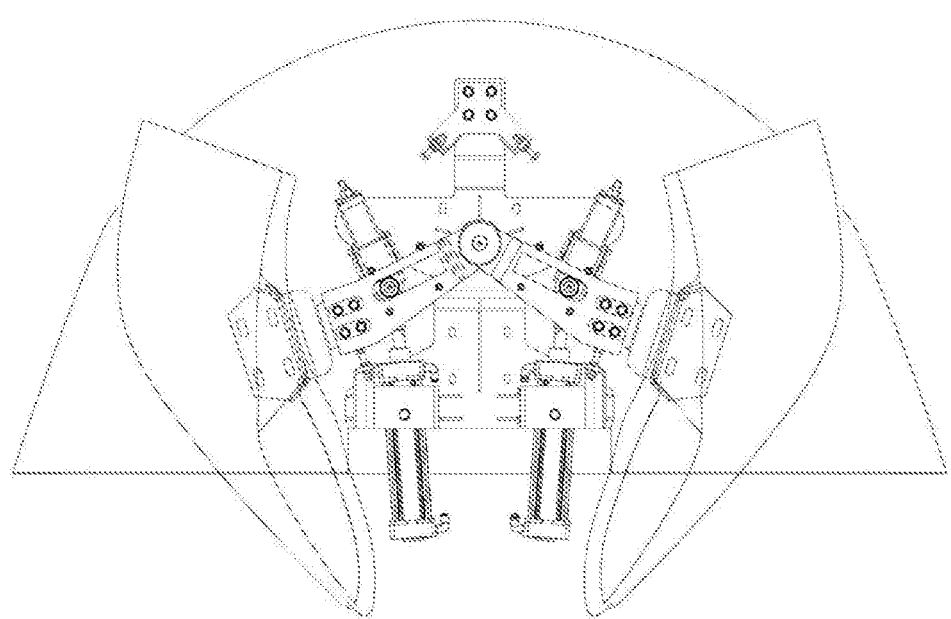
FIG. 12 is a sixth top view of the opening and closing mechanism.
Figure 13:
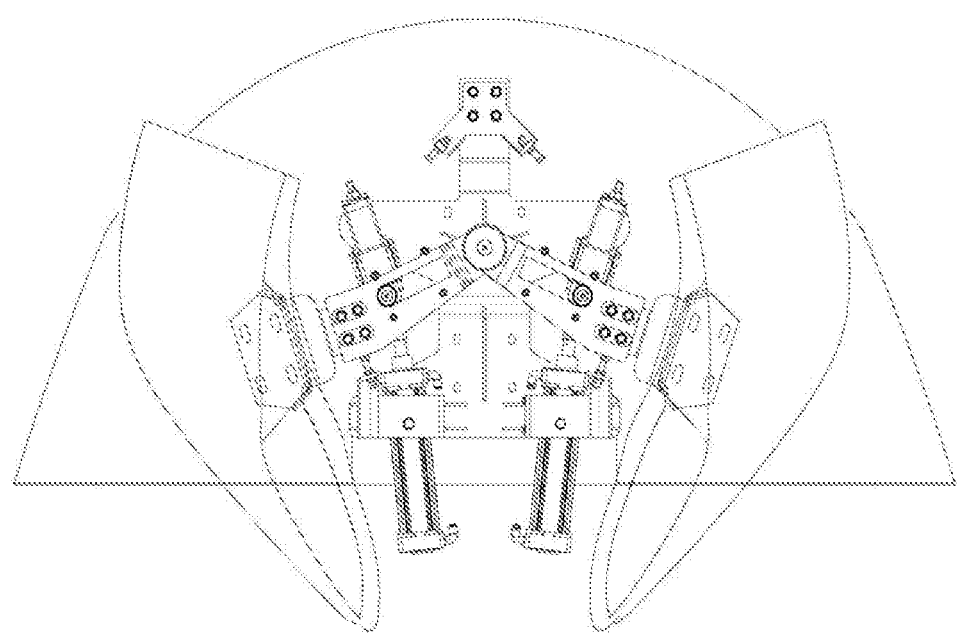
FIG. 13 is a seventh top view of the opening and closing mechanism.

Referring from FIG. 7 to FIG. 13, driven by the powered push cylinder 4 (retracted), the locking device 1 rotates on the baseplate 1, wherein the first locking device 11 on the left side rotates clockwise and the second locking device 12 on the right side rotates counterclockwise; the rolling wheel 109 of the locking device 1 rolls in the sliding groove 2033 of the support arm 203 and meanwhile drives the support arm 203 to rotate around the third shaft 205, the fairing 202 is driven by the support arm 203 to rotate to an open state, as shown in FIG. 12 and FIG. 13, and the support arm 203, under the action of the open-state limit stop 209, is unable to continue rotating. At this moment, if the locking device 1 continues rotating the rolling wheel 109, it is need to overcome the spring force and compress the spring.

It is to be noted that, when the locking device 1 rotates to a degree in which the central axis of the locking device 1 is approximately perpendicular to the central axis of the support arm 203 (that is, the casing 101 is approximately perpendicular to the support arm 203), the critical point of mechanical "dead point" is reached; at this moment, the second shaft 112 of the locking device 1 is closest to the support arm 203, and the second projection 2091 and the second receive part 2092 comes into contact with each other to play a role of mutual limit, the spring 103 is compressed the shortest and it might be in the above-mentioned second compressed state, as shown in FIG. 12. When the locking device 1 is continuously rotated, under the action of the second projection 2091 and the second receive part 2092, the rolling wheel 109 in the locking device 1 continues rolling in the sliding groove 2033, going across the mechanical "dead point", and at this moment, the distance from the second shaft 112 to the support arm 203 is not the largest distance, thus the spring 103 is released partially, as shown in FIG. 13. At this moment, the open state is limited. In the state shown in FIG. 13, if the rolling wheel 109 intends to go across the mechanical "dead point" in a reverse direction (that is, the rolling wheel on the left side intends to rotate counterclockwise) and move in the sliding groove 2033, this may be realized by applying an external force to compress the spring 103 from the state shown in FIG. 13 to the state shown in FIG. 12 (that is, a force by which the spring is further compressed is required). Therefore, without any external force, the locking device 1 as shown in FIG. 13 is in a self-locked state which is a very stable state. Even if certain vibration is applied to the overall opening and closing mechanism, the locking device 1 will not break away from the self-locked state, so that the opening and closing mechanism is kept in the open position.

(2) Closing Process

Figure 8:
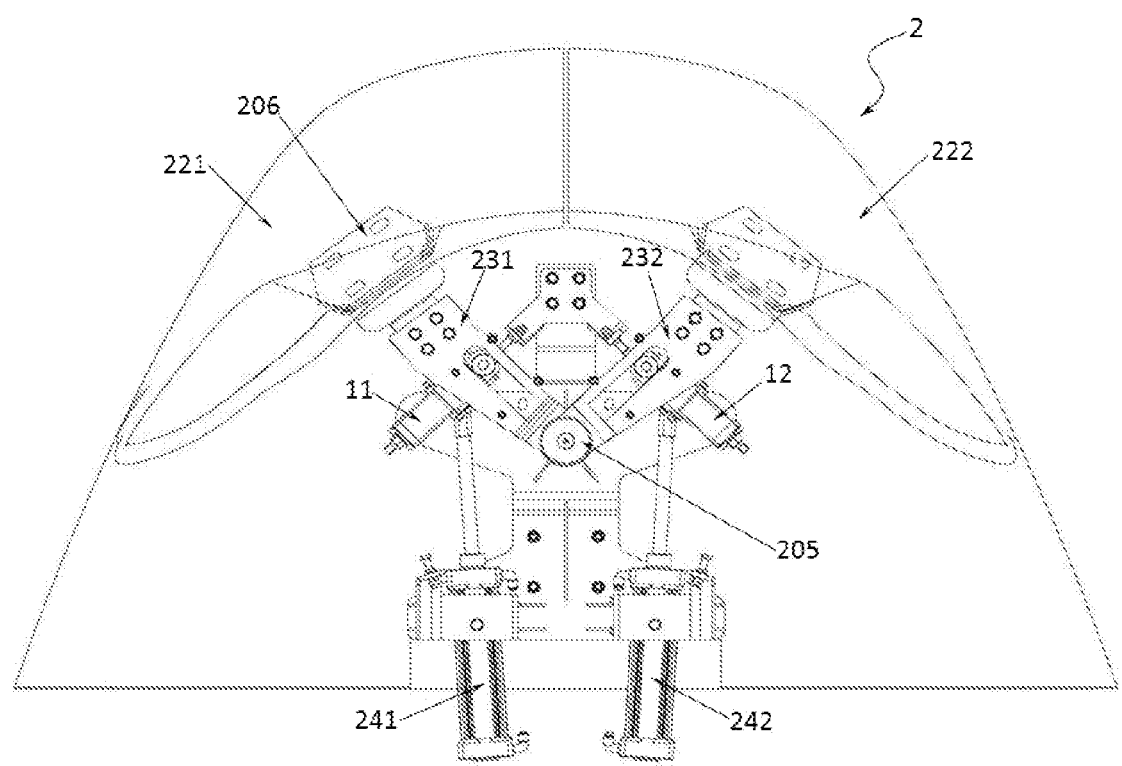
FIG. 8 is a second top view of the opening and closing mechanism.

Referring from FIG. 13 to FIG. 7, the extension of the cylinder 4 drives the locking device 1 to rotate. Due to the external force, the locking device 1 enters the "dead point" position (FIG. 12) from the open self-locked state (FIG. 13), and further out of the "dead point" position. Wherein, the first locking device 11 on the left side rotates counterclockwise, and the second locking device 12 on the right side rotates clockwise. At this moment, the rolling wheel 109 rolls in the sliding groove 2033 and meanwhile drives the support arm 203 to rotate around the third shaft 205, the fairing 202 is driven by the support arm 203 to rotate to the closed state, as shown in FIG. 8 and FIG. 7, and the support arm 203, under the action of the closed-state limit stop 208, is unable to continue rotating. At this moment, if the locking device 1 continues rotating the rolling wheel 109, it is need to overcome the spring force and compress the spring.

It is to be noted that, when the locking device 1 rotates to a degree in which the central axis of the locking device 1 is approximately perpendicular to the central axis of the support arm 203, the critical point of mechanical "dead point" is reached; at this moment, the second shaft 112 of the locking device 1 is closest to the support arm 203, and the first projection 2081 and the first receive part 2082 comes into contact with each other to play a role of mutual limit, the spring 103 is compressed the shortest and it might be in the above-mentioned second compressed state, as shown in FIG. 8. When the locking device 1 is continuously rotated, under the action of the first projection 2081 and the first receive part 2082, the rolling wheel 109 in the locking device 1 continues rolling in the sliding groove 2033, so that the rolling wheel on the left side goes across the mechanical "dead point" counterclockwise and the rolling wheel on the right side goes across the mechanical "dead point" clockwise. At this moment, the distance from the second shaft 112 to the support arm 203 is not the largest distance, thus the spring 103 is released partially, as shown in FIG. 7. At this moment, the closed state is limited. In the state shown in FIG. 7, if the rolling wheel 109 intends to go across the mechanical "dead point" in a reverse direction (e.g., the rolling wheel on the left side intends to rotate clockwise) and move in the sliding groove 2033, this may be realized by applying an external force to compress the spring 103 from the state shown in FIG. 7 to the state shown in FIG. 8. Therefore, without any external force, the locking device 1 as shown in FIG. 7 is in a self-locked state which is a very stable state. Thus, the opening and closing mechanism is kept in the closed position.

As a preferred implementation, at a lower end of the second shaft 112, there is also an extension portion 115 which is used for unlocking or locking manually. The extension portion 115 is preferably a polygonal cylinder; wherein the structure of a hexagonal cylinder is shown in FIG. 1.

The manual unlocking is as below: as shown in FIG. 7 (it may refer to FIG. 6, but the orientation is subject to FIG. 7), both the first locking device 11 and the second locking device 12 are in the self-locked state, and the description will be given by taking the first locking device 11 as an example. When a failure occurs in the cylinder 204, the locking device 11 cannot be pulled to rotate clockwise. In order to make the first locking device 11 go across the "dead point" to realize unlocking, a wrench, for example, an Allen wrench, is sleeved on the extension portion 115 of the second shaft 112, and the extension portion 115 is rotated clockwise, so that the first locking device 11 rotates clockwise together with the second shaft 112, moves toward the right side of the sliding groove 2033, further goes across the "dead point" shown in FIG. 8, continues rotating clockwise, and is thus unlocked (the state shown in FIG. 9).

Figure 9:
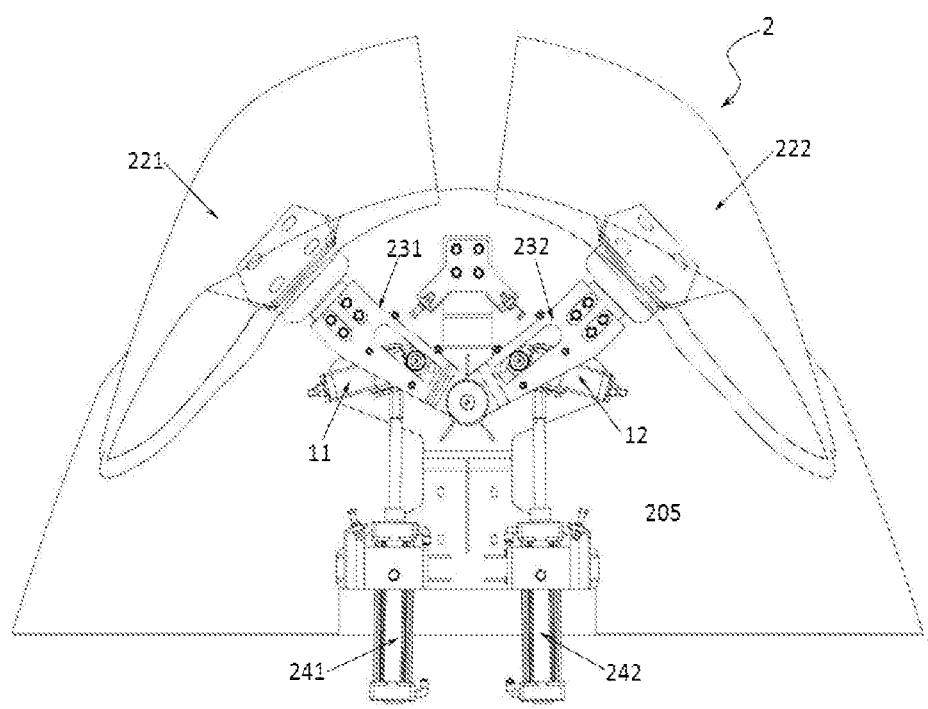
FIG. 9 is a third top view of the opening and closing mechanism.
Figure 10:
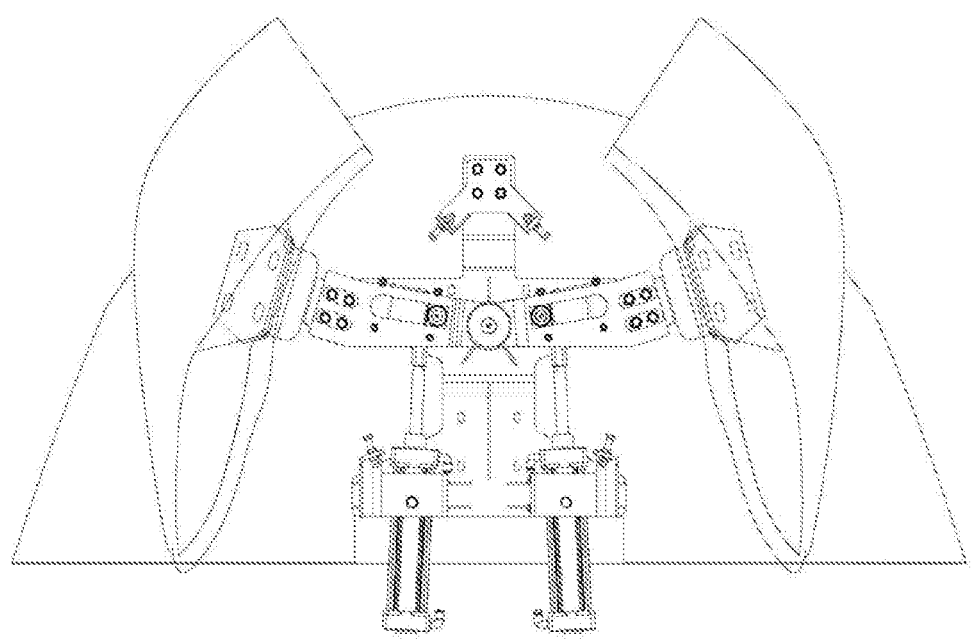
FIG. 10 is a fourth top view of the opening and closing mechanism.
Figure 11:
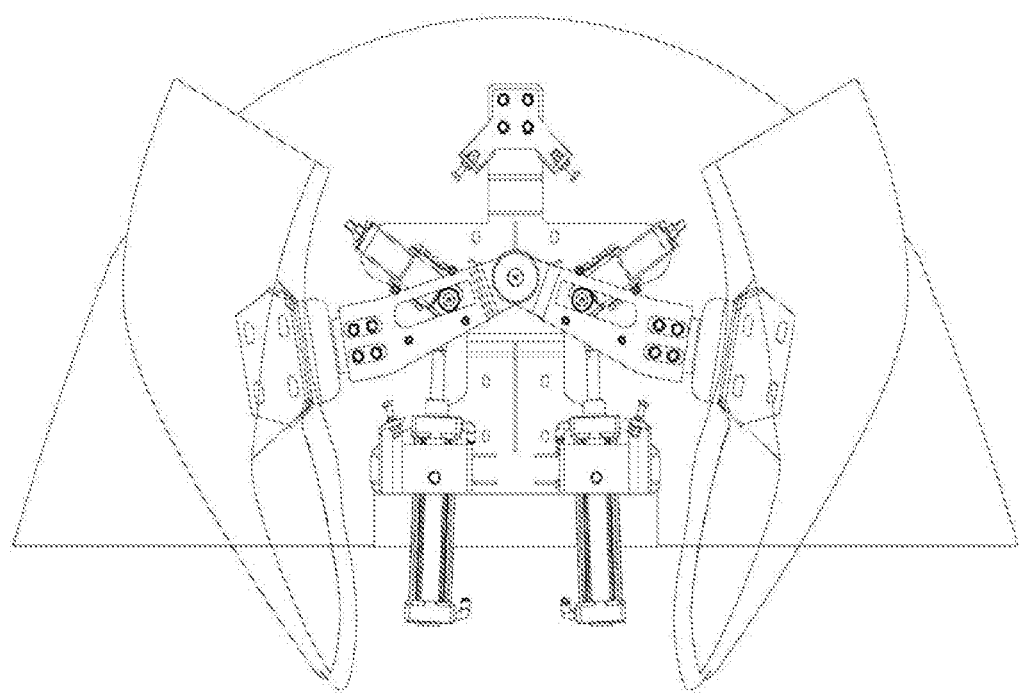
FIG. 11 is a fifth top view of the opening and closing mechanism.

The steps for manual locking are in a reverse order to the steps for manual unlocking, i.e., a process from FIG. 9 to FIG. 7. By rotating the extension portion 115 of the second shaft 112 counterclockwise, the first locking device 11 is also rotated counterclockwise to the self-locked state shown in FIG. 7.

The unlocking and locking of the opening and closing mechanism can be achieved by rotating the locking device 1 by a wrench, for example, an Allen wrench; both the manual unlocking and the manual locking are simple for operation.

What is claimed is:

1. An opening and closing mechanism comprising a locking device, a baseplate, a fairing, a support arm, and a powered push cylinder, wherein:
    the locking device comprises:
        a casing, the casing comprising a first end having a hole and a second end having an opening;
        a rod provided within the casing, wherein the rod passes through the hole and extends out of the casing such that a first end portion of the rod is positioned outside the casing, and a fastener is provided on the on the first end portion;
        a raised member located outside the casing and provided at a second end portion of the rod, the raised member having a diameter greater than a diameter of the opening, and a gap being formed between the raised member and the casing, wherein when the raised member moves relative to the casing along an axial direction of the rod, a dimension of the gap changes;
        a spring sleeved on the rod, wherein when the gap is reduced to zero, the spring on the rod is in a compressed state; and
        a first shaft provided on the raised member; and a second shaft provided on the casing adjacent to the first end of the casing;
    the locking device is rotatably mounted on the baseplate by the second shaft;
    a third shaft is provided on the baseplate; a first end of the support arm is rotatably sleeved on the third shaft, and a second end of the support arm is connected to the fairing by a fairing mounting base;
    a sliding groove in which the first shaft of the locking device is slidably located is formed on the support arm; the locking device is connected to a piston rod of the powered push cylinder, such that the piston rod can push the locking device to rotate with respect to the baseplate, and the first shaft slides in the sliding groove to cause the support arm to push the fairing mounting base to open or close the fairing; and
    the opening and closing mechanism is further provided with a closed-state limit stop to prevent the fairing from moving beyond a closing position and an open-state limit stop to prevent the fairing from moving beyond a maximal opening position.

2. The locking device according to claim 1, wherein, the spring is pre-compressed on the rod.

3. The locking device according to claim 2, wherein, a rolling wheel is rotatably sleeved on the first shaft.

4. The locking device according to claim 3, wherein, a cover plate having a diameter greater than an inner diameter of the rolling wheel is provided above the first shaft and the rolling wheel.

5. The locking device according to claim 1, wherein, the rod is a cylinder that can rotate within the casing; and a first baffle is provided between a front surface of the raised member and a front surface of the casing, and a second baffle is provided between a rear surface of the raised member and a rear surface of the casing.

6. The locking device according to claim 1, wherein, the rod has a first segment on which the first end portion is located and has a second segment on which the second end portion is located; the first segment has a diameter less than a diameter of the second segment; the spring is sleeved on the first segment and is pre-compressed into a chamber formed between the second segment and the first end of the casing.

7. The locking device according to claim 1, wherein, the first shaft is mounted on the raised member; or the first shaft and the raised member are of a unitary structure; or the rod, the raised member and the first shaft are of a unitary structure, and the first shaft and the second shaft extend toward opposite directions perpendicular to the axial direction of the rod.

8. The locking device according to claim 3, wherein, the rod is a cylinder that can rotate within the casing; and a first baffle is provided between a front surface of the raised member and a front surface of the casing, and a second baffle is provided between a rear surface of the raised member and a rear surface of the casing.

9. The locking device according to claim 3, wherein, the rod has a first segment on which the first end portion is located and has a second segment on which the second end portion is located; the first segment has a diameter less than a diameter of the second segment; the spring is sleeved on the first segment and is pre-compressed into a chamber formed between the second segment and the first end of the casing.

10. The opening and closing mechanism according to claim 1, wherein, the fairing comprises a first fairing and a second fairing, the support arm comprises a first support arm and a second support arm, the powered push cylinder comprises a first powered push cylinder and a second powered push cylinder, and the locking device comprises a first locking device and a second locking device;
    each of the first and second locking device is rotatably mounted on the baseplate by the second shaft, respectively;
    the first end of each of the first and second support arm is rotatably sleeved on the third shaft; the second end of the first support arm is connected to the first fairing by a first fairing mounting base, and the second end of the second support arm is connected to the second fairing by a second fairing mounting base;
    a first sliding groove in which the first shaft of the first locking device is slidably located is formed on the first support arm; the first locking device is connected to a piston rod of the first powered push cylinder; and a second sliding groove in which the first shaft of the second locking device is slidably located is formed on the second support arm; the second locking device is connected to a piston rod of the second powered push cylinder.

11. The opening and closing mechanism according to claim 1, wherein, the locking device is hinged with the piston rod at a connection position; and the connection position is on the casing, or on the raised member.

12. The opening and closing mechanism according to claim 1, wherein, the closed-state limit stop comprises a first projection and a first receive part; and the open-state limit stop comprises a second projection and a second receive part.

13. The opening and closing mechanism according to claim 12, wherein, the first projection is arranged on the baseplate, and the first receive part is arranged on the support arm; the second projection is arranged on the baseplate, and the second receive part is arranged on the support arm;

or, the first projection is arranged on the fairing, and the first receive part is arranged on the baseplate; the second projection is arranged on the baseplate, and the second receive part is arranged on the support arm;

or, the first projection is arranged on the baseplate, and the first receive part is arranged on the support arm; the second projection is arranged on the fairing, and the second receive part is arranged on the baseplate;

or, the first projection is arranged on the fairing, and the first receive part is arranged on the baseplate; the second projection is arranged on the fairing, and the second receive part is arranged on the baseplate.

14. The opening and closing mechanism according to claim 1, wherein, a length of the sliding groove is provided such that when the locking device is perpendicular to the sliding groove, the locking device is spaced from opposite distal ends of the sliding groove.

15. The opening and closing mechanism according to claim 1, wherein, at a lower end of the second shaft, there is further an extension portion, used for unlocking or locking manually.

16. The opening and closing mechanism according to claim 10, wherein, the closed-state limit stop comprises a first projection and a first receive part; and the open-state limit stop comprises a second projection and a second receive part.

17. The opening and closing mechanism according to claim 10, wherein, a length of the sliding groove is provided such that when the locking device is perpendicular to the sliding groove, the locking device is spaced from opposite distal ends of the sliding groove.

18. An opening and closing mechanism comprising a baseplate, a first fairing, a second fairing, a first support arm, a second support arm, a first powered push cylinder, a second powered push cylinder, a first locking device, and second locking device, wherein:

each locking device comprises:

a casing, the casing comprising a first end having a hole and a second end having an opening;

a rod provided within the casing, wherein the rod passes through the hole and extends out of the casing such that a first end portion of the rod is positioned outside the casing, and a fastener is provided on the on the first end portion;

a raised member located outside the casing and provided at a second end portion of the rod, the raised member having a diameter greater than a diameter of the opening, and a gap being formed between the raised member and the casing, wherein when the raised member moves relative to the casing along an axial direction of the rod, a dimension of the gap changes;

a spring sleeved on the rod, wherein when the gap is reduced to zero, the spring on the rod is in a compressed state; and a first shaft provided on the raised member;

each of the first and second locking device is rotatably mounted on the baseplate by a second shaft;

a third shaft and a fourth shaft are provided on the baseplate; a first end of the first support arm is rotatably sleeved on the third shaft, and a second end of the first support arm is connected to the first fairing by a first fairing mounting base;

a first end of the second support arm is rotatably sleeved on the fourth shaft, and a second end of the second support arm is connected to the second fairing by a second fairing mounting base;

a first sliding groove in which the first shaft of the first locking device is slidably located is formed on the first support arm the first locking device is connected to a piston rod of the first powered push cylinder a second sliding groove in which the first shaft of the second locking device is slidably located is formed on the second support arm; the second locking device is connected to a piston rod of the second powered push cylinder; and the opening and closing mechanism is further provided with a closed-state limit stop and an open-state limit stop.

19. The opening and closing mechanism according to claim 18, wherein, the closed-state limit stop comprises a first projection and a first receive part; and the open-state limit stop comprises a second projection and a second receive part.

* * * * *